United States Patent
Leith

[11] 3,797,907
[45] Mar. 19, 1974

[54] FRESNEL LENS SCATTER PLATE FOR DATA REDUCTION HOLOGRAPHY

[75] Inventor: Emmett N. Leith, Ann Arbor, Mich.

[73] Assignee: The United States of America as represented by the Secretary of the Navy, Washington, D.C.

[22] Filed: Sept. 18, 1972

[21] Appl. No.: 290,042

[52] U.S. Cl. ................................................. 350/3.5
[51] Int. Cl. .......................................... G02b 27/00
[58] Field of Search....... 350/3.5, 211, 167, 162 ZP; 356/111

[56] References Cited
UNITED STATES PATENTS

| | | |
|---|---|---|
| 3,664,723 | 5/1972 | Toth et al. .......................... 350/3.5 |
| 3,704,930 | 12/1972 | McMahon ............................. 350/3.5 |
| 3,677,617 | 7/1972 | Upatnieks ............................ 350/3.5 |

*Primary Examiner*—Ronald J. Stern
*Attorney, Agent, or Firm*—R. S. Sciascia; J. W. Pease; H. A. David

[57] ABSTRACT

Holographic apparatus and method utilizes a Fresnel lens as a scatter plate in data reduction holography. A second embodiment utilizes a Fresnel lens in series with a fly's eye lens array.

2 Claims, 3 Drawing Figures

PATENTED MAR 19 1974 3,797,907

3,797,907

FRESNEL LENS SCATTER PLATE FOR DATA REDUCTION HOLOGRAPHY

BACKGROUND OF THE INVENTION

This invention relates to the art of holography and more particularly to an improved holographic system and technique having utility especially in the making and projection of hologram movies.

In the process of making hologram movies it is desirable to have a large image which appears to emanate from a large aperture, but which in fact emanates from a small aperture such as a 35 mm. film frame.

One way to accomplish this is the scatter plate method of data reduction, as described in U.S. Pat. No. 3,639,032 to K. A. Haines. That technique, however, degrades the image. Inasmuch as image definition is of prime importance, it would be more desirable for motion picture purposes to have a holographic data reduction system which would render an image of satisfactory resolution even at the expense of reducing the angle over which the image can be viewed.

SUMMARY OF THE INVENTION

With the foregoing in mind it is a principal object of this invention to provide an improved method and scatter plate data reduction apparatus for the recording of holograms and generation of images therefrom which appear to be projected from an aperture which is larger by a number of times than the actual aperture of the holograms.

Another object of this invention is the provision of a method and apparatus of the foregoing character and which permits a relatively short coupling space between the hologram and the scatter plate means, thereby contributing to the achievement of reasonably compact holographic motion picture apparatus.

As another object this invention aims to accomplish the foregoing through the use of a Fresnel lens as a scatter plate means in holographic data reduction and image projecting systems.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
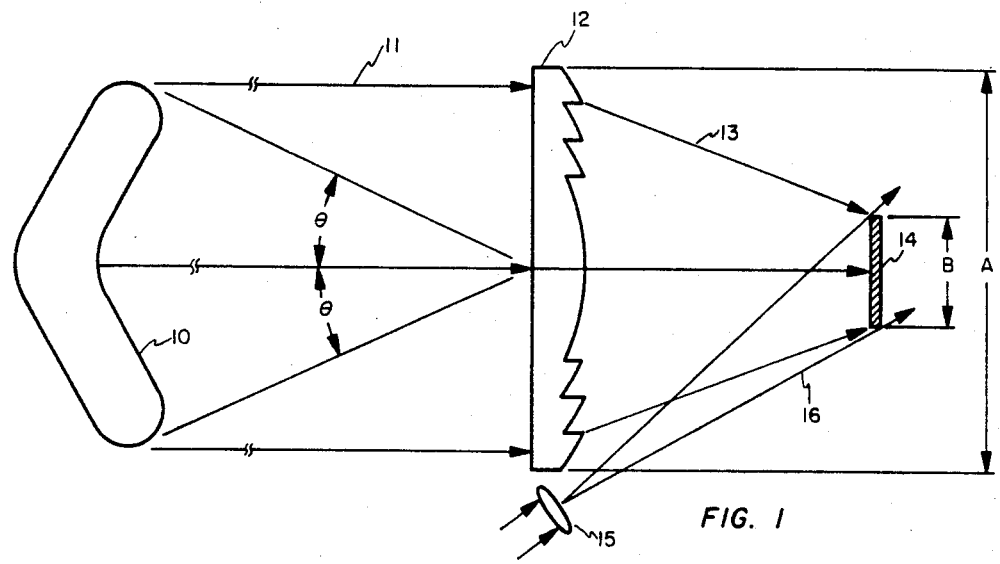
FIG. 1 is a diagrammatic view illustrating recording of an object hologram according to the invention.

The holographic apparatus and method embodying the invention will now be explained with reference to the drawings. Referring first to FIG. 1, an object 10 usually three dimensional, is illuminated by coherent light from a laser (not shown), the wavefront 11 from the object being directed as at 10 by a Fresnel lens 12 to the plane occupied by a hologram recording medium, e.g. photographic film 14. A reference beam 16, which is derived in a known manner from the object illuminating laser system having a lens indicated at 15, is directed onto the film 14 so as to interfere with the wavefront passed by the Fresnel lens 12 and thereby to cause a hologram of the object 10 to be recorded on the film.

In accordance with the invention, and in order to be useful for motion picture purposes, the aperture A of the Fresnel lens 12 is a number of times larger than the film plane aperture B. In one useful example the diameter of the aperture A would be on the order of 10 inches while that of the aperture B would be on the order of 1 inch.

In addition it is advantageous to have the focal length of the lens 12 such that object points within angles θ, about ± 10° off axis, will be within the scope of the lens. It will be recognized by those knowledgeable in the art to which the invention pertains that a lens having a focal length of about 3 inches and an $f$ number of about 0.33 will meet these criteria. Recalling that the diameter of the lens 12 in this example is about 10 inches, it will be recognized that a conventional lens would not be realistic. However Fresnel lenses whose specifications approach or meet these requirements are readily available.

Figure 2:
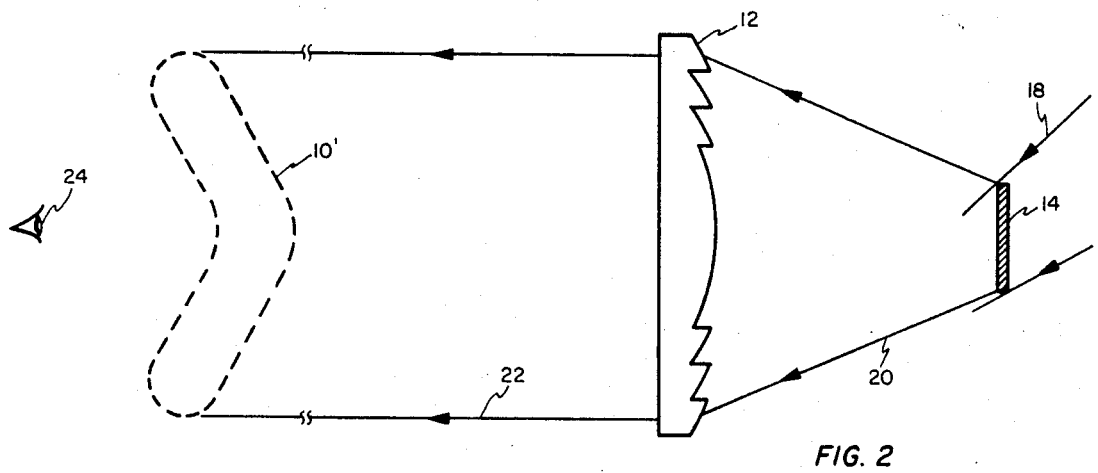
FIG. 2 is a diagrammatic view illustrating generation of an image from a hologram made according to FIG. 1.

Referring now to FIG. 2 in which those elements which are the same as described above bear the same reference numerals, the hologram recorded on the film 14 is illuminated by a reconstruction beam 18 of coherent light the rays of which are reciprocal in direction to those of the reference beam 16 in FIG. 1. The reconstruction beam 18 is preferably of the same frequency as the reference beam 16 and is in part diffracted by the hologram on the film 14 to form a wavefront the travel of which is represented in FIG. 2 by beam 20. The Fresnel lens 12 redirects the direction of travel of the wavefront as indicated by 22 in FIG. 2, to form a reconstructed, three dimensional image 10' of the object 10, viewable by eye 24. A Fresnel lens such as 12, of course, gives poor imagery of the object 10 at the plane of the film 14. However at the film plane the optical frequencies that comprise the image, or its Fresnel Fraunhofer diffraction patterns, are greatly increased so that light passed by the Fresnel lens structure will have very high spatial frequencies, but the total aperture of the hologram will be very small.

It can be said that the space bandwidth product of the signal (the light that leaves the object 10 and impinges on the Fresnel lens 12) is preserved, but the bandwidth part is vastly increased, while the spatial extent becomes smaller. Hence, the effect of all the light that falls on the Fresnel lens during recording of the hologram is preserved in the much smaller hologram area. Upon readout the reference light direction is reversed to form the reconstruction beam 18, and a real image (or conjugate) wave is generated which passes through the Fresnel lens 12 so that an image 10' is formed which can be viewed against the background of the Fresnel lens. The image quality is very good since aberations of the Fresnel lens 12 are cancelled during image reconstruction.

Figure 3:
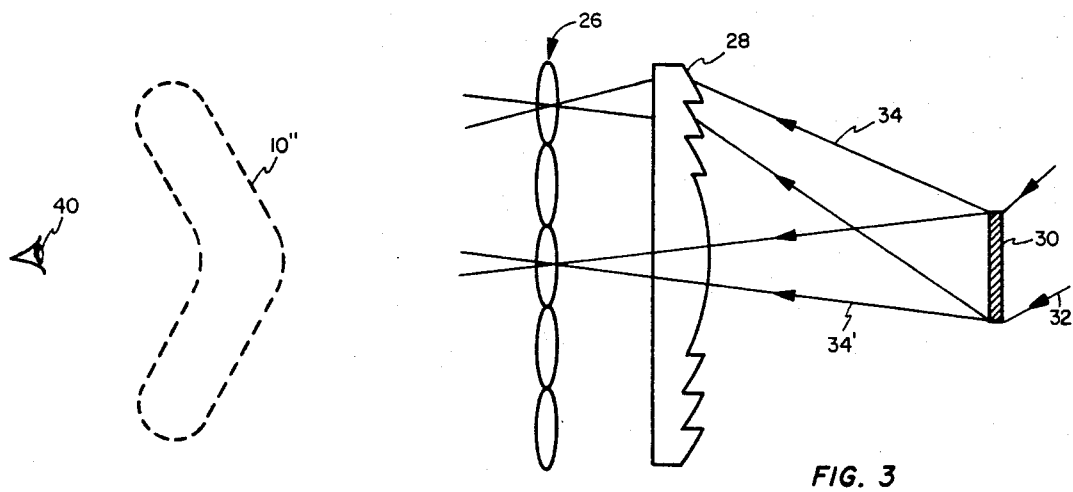
FIG. 3 is a diagrammatic view illustrating another embodiment of the invention.

Referring now to FIG. 3 there is illustrated an embodiment of the invention which differs from that described above in the inclusion of a fly's-eye lens array 26 in front of a Fresnel lens 28. A film 30 bears a hologram previously recorded by coherent light passing from an object, such as 10, through the array 26 and Fresnel lens 28 and interfering with light from a reference beam, such as 16 of FIG. 1. A reconstruction beam 32 is in part diffracted by the hologram on film 30 to form wave fronts represented by beams 34, 34' which pass through the Fresnel lens 28 and lens array 26 to form an image 10'' viewable by eye 40.

In considering the disclosure as described above it should be noted that it is not necessary or desirable that the object be imaged onto the photographic plate. On the contrary, to obtain more light directed to the viewing eye it is desirable for the photographic plate to be positioned at a plane, beyond the focal plane of the Fresnel means 12, where the observer will view the image, i.e., a plane lying a few feet to the left of the object 10, where the eye 24 is positioned.

Obviously many modifications and variations of the present invention are possible in the light of the above teachings. It is therefore to be understood that within the scope of the appended claims the invention may be practiced otherwise than as specifically described.

What is claimed is:

1. A method of generating holograms and three dimensional images therefrom comprising the steps of:
    illuminating an object with coherent light;
    providing a Fresnel lens having an $f$ number of less than unity for collecting said coherent light as modified by said object;
    providing a recording medium positioned to receive said object modified light;
    said Fresnel lens directing said object modified light to said recording medium;
    said Fresnel lens having an area of 100 or more times the area of said recording medium;
    providing a reference beam mutually coherent with said object illuminating coherent light and directed at said recording medium for interference with said object modified light to form a hologram in which the space bandwidth product of the hologram forming ligt is maintained while the bandwidth part is increased and the spatial extent is decreased; and illuminating said hologram with a reconstruction beam of coherent light so that said reconstruction beam is in part directed by said hologram through said Fresnel lens or replica thereof so as to produce a visible three dimensional image of said object.

2. A method as defined in claim 1 wherein:
    said recording medium is positioned at a location displaced from the image of said object formed by said Fresnel lens.

* * * * *